United States Patent
He et al.

(10) Patent No.: US 8,730,964 B2
(45) Date of Patent: May 20, 2014

(54) SYSTEM FOR DATA COMMUNICATIONS, ROUTER, AND METHOD FOR DATA TRANSMISSION AND MOBILITY MANAGEMENT

(75) Inventors: Cheng He, Shenzhen (CN); Yanping Xiang, Shenzhen (CN); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 568 days.

(21) Appl. No.: 12/982,551

(22) Filed: Dec. 30, 2010

(65) Prior Publication Data
US 2012/0002600 A1  Jan. 5, 2012

Related U.S. Application Data (63) Continuation of application No. PCT/CN2009/072475, filed on Jun. 26, 2009.

(30) Foreign Application Priority Data

Nov. 28, 2008  (CN) .......................... 2008 1 0219540

(51) Int. Cl.
H04W 4/00 (2009.01)
H04L 12/28 (2006.01)
H04J 3/16 (2006.01)

(52) U.S. Cl.
USPC ............ 370/392; 370/328; 370/338; 370/471

(58) Field of Classification Search
None
See application file for complete search history.

(56) References Cited

U.S. PATENT DOCUMENTS

| 8,019,889 | B1 * | 9/2011 | Biswas et al. ................. 709/245 |
| 2003/0014540 | A1 * | 1/2003 | Sultan et al. .................. 709/240 |
| 2005/0010686 | A1 | 1/2005 | Nishida et al. |
| 2005/0271015 | A1 | 12/2005 | Nishida et al. |
| 2009/0052410 | A1 | 2/2009 | Yoshida |

FOREIGN PATENT DOCUMENTS

| CN | 1543142 A | 11/2004 |
| CN | 1610317 A | 4/2005 |
| CN | 1708177 A | 12/2005 |

(Continued)

OTHER PUBLICATIONS

Menth, Michael et al. "Global Locator, Local Locator, and Identifier Split (GLI-Split)" University of Würzburg Institute of Computer Science Research Report Series—Report No. 470. Apr. 2010.

(Continued)

*Primary Examiner* — Jutai Kao
(74) *Attorney, Agent, or Firm* — Brinks Gilson & Lione (57) ABSTRACT

The embodiments of the present invention disclose a system for data communications, a router, and a method for data transmission and mobility management. The method for data transmission includes: receiving, by a first AR, data; identifying the transmission route based on the results of querying the local mapping information base; and transmitting data, where the local mapping information base stores the mappings between IDs and LLs. The embodiments of the present invention completely separate the ID, LL, and GL of the terminal, and thus solve the problems with the routing table expansion and scalability faced by the Internet. In this way, the terminal data can be transmitted without changing the terminal or the routing protocol stack; in addition, the hierarchical mapping helps reduces the amount of locally and globally stored information, and thus accelerating the query.

10 Claims, 7 Drawing Sheets

(56) References Cited

FOREIGN PATENT DOCUMENTS

| CN | 1801764 A | 7/2006 |
|---|---|---|
| CN | 101112058 A | 1/2008 |
| CN | 101147366 A | 3/2008 |

OTHER PUBLICATIONS

Ahlgren, Bengt et al. "A Node Identity Internetworking Architecture" Ambient Networks. May 26, 2006.
Farinacci D., et al. "Locator/ID Separation Protocol (LISP) daraft-farinacci-lisp-08.txt" The IETF Trust. Jul. 10, 2008.
International Search Report issued in corresponding PCT Application No. PCT/CN2009/072475; mailed Oct. 1, 2009.
Office Action issued in corresponding European Patent Application No. 09828565.3, mailed Nov. 9, 2012.
Extended European Search Report issued in corresponding European Patent Application No. 09828565.3, mailed May 30, 2011.
Office Action issued in corresponding Chinese Patent Application No. 200810219540.3, mailed Jun. 22, 2011.
Written Opinion of the International Searching Authority issued in corresponding PCT Patent Application No. PCT/CN2009/072475, mailed Oct. 1, 2009.
In et al., "Splitting Mechanism for IP into Identifier and Locator in NGN", ICACT, Feb. 12-14, 2007. ISBN 978-89-5519-131-8 93560.
Kafle et al., "Generic Identifiers for ID/Locator Split Internetworking", Kaleidoscope, ITU 2008.
Saucez et al., "Interdomain Traffic Engineering in a Locator/Identifier Separation Context", INM IEEE Oct. 19, 2008.

\* cited by examiner

FIG. 9

SYSTEM FOR DATA COMMUNICATIONS, ROUTER, AND METHOD FOR DATA TRANSMISSION AND MOBILITY MANAGEMENT

CROSS-REFERENCE TO RELATED APPLICATIONS

This application is a continuation of International Application No. PCT/CN2009/072475, filed on Jun. 26, 2009, which claims priority to Chinese Patent Application No. 200810219540.3, filed on Nov. 28, 2008, both of which are hereby incorporated by reference in their entireties.

FIELD OF THE DISCLOSURE

This application relates to the field of communications, and in particular, a system for data communications, a router, and a method for data transmission and mobility management.

BACKGROUND

In the traditional Internet, the routing and addressing architectures are based on IP address space only, and the data routing and session are identified with the same IP address. This limits the scalability of the Internet and results in complicated mobility management. After years of discussion, the academic and industrial sectors generally believe that separating the identifier (ID) and locator of a node will help address many problems facing the Internet.

Currently, many solutions have been launched in the sector by separating the ID and locator of a terminal (e.g., a node). With different features and focuses, these solutions do not treat the network as a whole, and thus vary significantly in the implementation mode. Currently, none of the solutions is accepted as practical.

SUMMARY

A system for data communications is provided to transmit the terminal data that takes IDs as the source and destination addresses. The system includes at least one of:

an access router (AR), configured to: set local locators (LLs), establish communications links to the devices within the area by using the set LLs, and transmit the received data through the transmission routes, which are obtained by querying the mappings between IDs and LLs in the local mapping information base according to the destination ID of the received data; and an area border router (ABR), configured to: set global locators (GLs) and LLs, establish communications links to the devices outside the area by using the set GLs, establish communications links to the devices within the area by using the set LLs, and transmit the received data through the transmission routes, which are obtained by querying the mappings between IDs and GLs in the global mapping information base according to the destination ID of the received data.

An AR is provided in an embodiment of the present invention. The AR includes:

a configuration module, configured to: set an LL as the intra-area communications address of the AR;

a link establishment module, configured to: establish the communications links to the devices within the area by using the set LL;

a receiving module, configured to: receive the data;

a query module, configured to: query whether an LL that maps the destination ID of the data received by the receiving exists in the local mapping information base;

a route identifying module, configured to: identify the route for transmitting the received data based on the results of querying the local mapping information base by the query module; and a transmission module, configured to: transmit the received data through the transmission route identified by the route identifying module and the link established by the link establishment module.

An ABR is provided in an embodiment of the present invention. The ABR includes:

a configuration module, configured to: set a GL as the inter-area communications address and an LL as the intra-area communications address;

a link establishment module, configured to: establish the communications links to the devices outside the area by using the set GL, and establish the communications links to the devices within the area by using the set LL;

a receiving module, configured to: receive the data;

a query module, configured to: query whether an LL that maps the destination ID of the data received by the receiving module exists in the local mapping information base, or query whether a GL that maps the destination ID of the data received by the receiving module exists in the global mapping information base;

a route identifying module, configured to: identify the route for transmitting the received data based on the results of querying the local or global mapping information base by the query module; and a transmission module, configured to: transmit the received data through the transmission route identified by the route identifying module and the link established by the link establishment module.

A method for data transmission is provided in an embodiment of the present invention. The method includes:

receiving, by the first AR, the data;

identifying the transmission route based on the results of querying the local mapping information base; and transmitting data, wherein the local mapping information base stores the mappings between IDs and LLs.

A method for terminal mobility management is provided in an embodiment of the present invention. The method includes:

moving, by the terminal, from the management area of the initial AR to that of the current AR in the same area; and establishing a communications link between the current and initial ARs, by using the LLs as the communications addresses, for transmitting data of the terminal.

A method for terminal mobility management is provided in an embodiment of the present invention. The method includes:

establishing a communications link between the current and initial ABRs, by using the GLs as the communications addresses, for transmitting data of the terminal, when the terminal moves from the management area of the initial ABR to that of the current ABR.

The embodiments of the present invention completely separate the ID, LL, and GL of the terminal, and thus solve the problems with the routing table expansion and scalability faced by the Internet. In this way, the terminal data can be transmitted without changing the terminal or the routing protocol stack.

BRIEF DESCRIPTION OF THE DRAWINGS

To describe the technical solutions in the embodiments of the present invention or in the prior art more clearly, the following outlines the accompanying drawings for illustrating such technical solutions. Apparently, the accompanying drawings outlined below are some embodiments of the present invention, and those skilled in the art can derive other drawings from such accompanying drawings without creative efforts.

DETAILED DESCRIPTION OF THE EMBODIMENTS

The technical solutions in the embodiments of the present invention are described below clearly and completely with reference to the accompanying drawings in the embodiments of the present invention. Apparently, the described embodiments are merely some of the embodiments of the present invention, rather than all of the embodiments. Based on the embodiments of the present invention, those skilled in the art can obtain other embodiments without making creative efforts, which all fall within the scope of the present invention.

Figure 1:
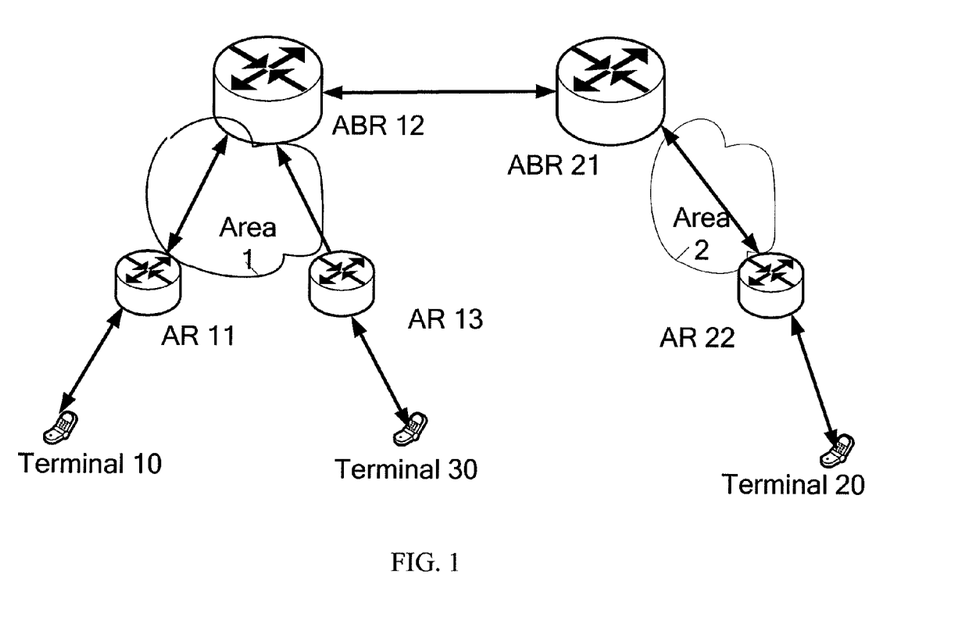
FIG. 1 shows an architecture of a system for data communications according to an embodiment of the present invention.

FIG. 1 shows an architecture of a system for data communications according to an embodiment of the present invention. In practice, a system for data communications includes at least one AR and at least one ABR. In the architecture used in the embodiments of the present invention, the IDs and locators are separated, and the network is divided into multiple areas. The AR and ABR use LLs for intra-area communications; the ABR uses the GL for inter-area communications. As shown in FIG. 1, the system for data communications provided in this embodiment includes AR 11, ABR 12, AR 13, ABR 21, and AR 22. AR 11, AR 13, and ABR 12 are in area 1 and are used for managing the data transmission by the terminals in area 1 (terminal 10 and terminal 30); AR 22 and ABR 21 are in area 2 and are used for managing the data transmission by the terminal in area 2 (terminal 20). Specifically, in addition to the basic functions, each AR in this embodiment (AR 11, AR 13, or AR 22) is configured with an LL for establishing communications links to the devices within the area. After receiving data, the AR queries the transmission route in the local mapping information base according to the destination ID of the data and then transmits the received data. The local mapping information base stores the mappings between IDs and LLs. In addition to the basic functions, each ABR (ABR 12 or ABR 21) is configured with a GL for establishing communications links to the devices outside the area and an LL for establishing communications links to the devices within the area. After receiving data, the ABR queries the transmission route in the local or global mapping information base according to the destination ID of the data and then transmits the data. The global mapping information base stores the mappings between IDs and GLs. In practice, the LLs and GLs can be existing IPv4/IPv6 addresses.

Figure 2:
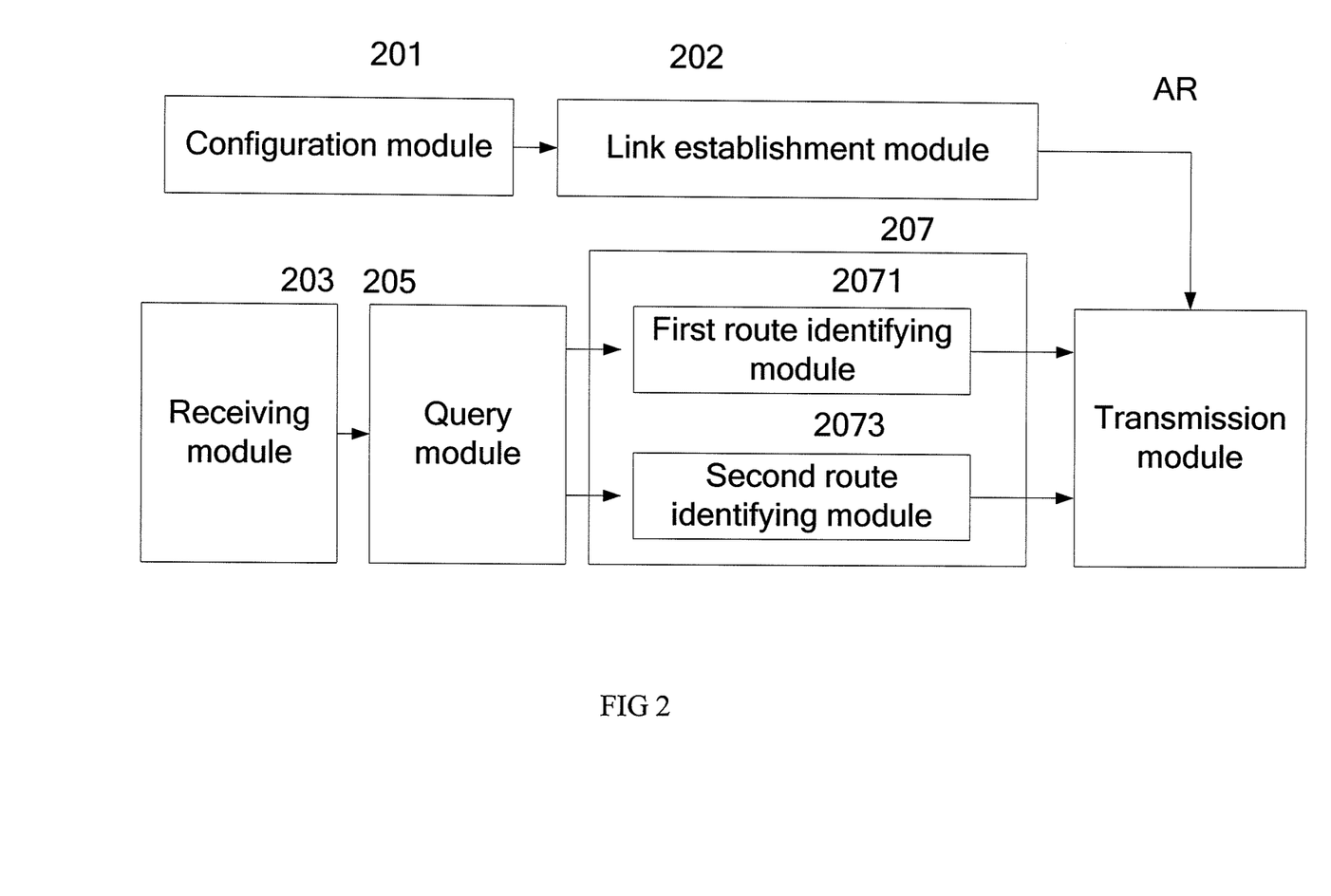
FIG. 2 shows a structure of an AR in a system for data communications according to an embodiment of the present invention.

Further, as shown in FIG. 2, the AR (AR 11, AR 13, or AR22) in the system for data communications of the embodiment includes:

a configuration module 201, configured to: configure an LL as the intra-area communication address of the AR;

a link establishment module 202, configured to: configure the LL for establishing communications links to the devices within the area (for example, AR 11 in FIG. 1 can establish communications links to terminal 10, ABR 12, and ABR 21);

a receiving module 203, configured to: receive the data; in practice, receiving module 203 receives data from terminal (for example, AR 11 in FIG. 1 can receive data from terminal 10), an ABR in the same area (for example, AR 11 in FIG. 1 can receive from ABR 12 the data to be sent to terminal 10 from area 2), and a different AR in the same area (for example, AR 11 in FIG. 1 can receive data from AR 13);

a query module 205, configured to: query whether an LL that maps the destination ID of the data received by receiving module 203 exists in the local mapping information base;

a route identifying module 207, configured to: identify the route for transmitting the received data based on the results of querying the local mapping information base by the query module 205; specifically, the route identifying module 207 further includes: a first route identifying module 2071, configured to: determine to transmit the data to the AR that maps the LL if the query module 205 obtains the LL that maps the ID of the data in the local mapping information base; a second route identifying module 2073, configured to: determine to transmit the data to the ABR that is bound to the AR in the same area if the query module 205 does not identify an LL that maps the ID of the data in the local mapping information base; and a transmission module 209, configured to: transmit the received data through the transmission route identified by the route identifying module 207 and the link established by the link establishment module. Specifically, after the route identifying module determines to transmit the data to the AR that maps the identified LL, the transmission module 209 transmits the data through the communication link to the AR. For example, if the route identifying module 207 of AR 11 determines to transmit the data to the identified LL of AR 13, the transmission module 209 transmits the data to AR 13, with the source address being the LL of AR 11 and the destination address being the LL of AR 13. If the route identifying module 207 does not identify the ID of the data in the local mapping information base, the transmission module 209 transmits the data to the bound ABR 12 through a communications link, with the source address being the LL of AR 11 and the destination address being the LL of ABR 12.

Further, the AR in this embodiment may further includes an information updating module, configured to: update the local mapping information base and notify the ABR in the same area of the update results when the terminal enters or leaves the management area of the AR. For example, when terminal 10 in FIG. 1 leaves the management area of AR 11 and enters the management area of AR 13, AR 11 updates the local mapping information base and notifies ABR 12 in the same area of the update results.

Figure 3:
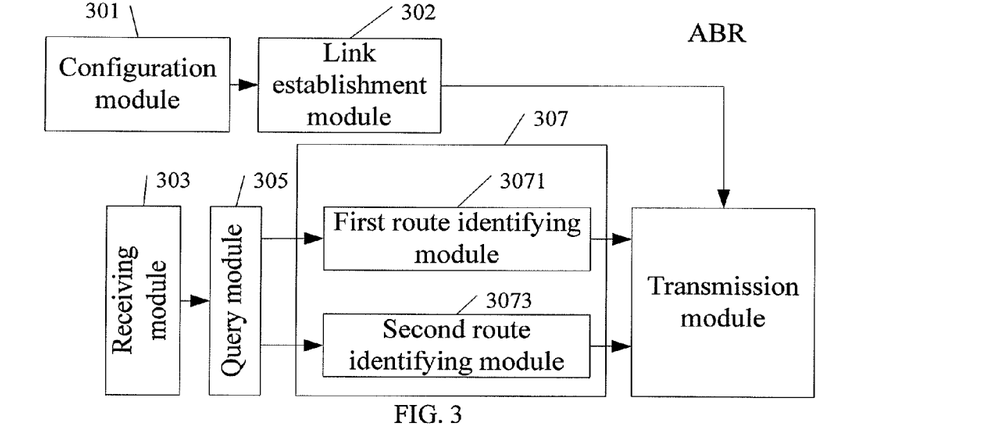
FIG. 3 shows a structure of an ABR in a system for data communications according to an embodiment of the present invention.

As shown in FIG. 3, the ABR (ABR 12 or ABR 21) includes:

a configuration module 301, configured to: configure a GL as the inter-area communications address and an LL as the intra-area communications address;

a link establishment module 302, configured to: establish communications links to the devices outside the area by using the configured GL as the communications address, and establish communications links to the devices within the area by using the configured LL as the communications address; for example, ABR 12 in FIG. 1 establishes communications links to AR 11 and AR 13 by using the LL and establishes communications links to ABR 21 by using the GL;

a receiving module 303, configured to: receive the data; in practice, the ABR can receive data from the AR in the same area (For example, ABR 12 in FIG. 1 can receive data from AR 11) or the ABR in a different area (For example, ABR 12 in area 1 in FIG. 1 can receive data from ABR 21 in area 2);

a query module 305, configured to: query whether an LL that maps the destination ID of the data received by receiving module 303 exists in the local mapping information base, or query whether a GL that maps the destination of the data received exists in the global mapping information base;

a route identifying module 307, adapted to: identify the route for transmitting the received data based on the results of querying the local or global mapping information base by query module 305; specifically, the route identifying module 307 further includes:

a first route identifying module 3071, configured to: determine to transmit the data to the AR that maps the LL if the query module 305 obtains the LL that maps the destination ID of the data in the local mapping information base; for example, if the query module 305 of ABR 12 in FIG. 1 obtains the LL that maps the destination ID of the received data (for example, LL of AR 11) in the local mapping information base, the route identifying module 307 can determine to transmit the data to AR 12; and a second route identifying module 3073, configured to: determine to transmit the data to the ABR that maps the identified GL if the query module 305 obtains the GL that maps the ID of the data in the global mapping information base. For example, if the query module 305 of ABR 12 in FIG. 1 obtains the GL that maps the destination ID of the received data (for example, GL in ABR 21) in the global mapping information base, the route identifying module 3073 can determine to transmit the data to ABR 21, with the source address being the GL of ABR 12; and a transmission module 309, configured to: transmit the received data through the transmission route identified by the route identifying module 307 and the link established by the link establishment module. For example, if the route identifying module 307 determines to transmit the data to the AR that maps the identified LL, the transmission module 309 transmits the data to the AR. Specifically, the if route identifying module 307 determines to transmit the data to AR 11, the transmission module 309 of ABR 12 transmits the data to AR 11, with the source address being the LL of ABR 12 and the destination address being the LL of AR 11.

Further, the ABR in this embodiment may further includes an information updating module, configured to: update the global or local mapping information base when the terminal enters or leaves the management area of the ABR.

The ABR in this embodiment may further includes at least one of:

a local mapping information storage module, configured to: store the local mapping information base; and a global mapping information storage module, configured to: store the global mapping information base.

The system for data communications according to this embodiment includes at least one AR and at least one ABR. However, in addition to the AR and ABR, the system for data communications provided in other embodiments of the present invention further includes at least one of: a local mapping information storage device, configured to: store the local mapping information base; and a global mapping information storage device, configured to: store the global mapping information base. The AR and ABR queries the local or global mapping information base to identify the route for transmitting the data.

The embodiments of the present invention completely separate the ID, LL, and GL of the terminal, and thus solve the problems with the routing table expansion and scalability faced by the Internet. In this way, the terminal data can be transmitted without changing the terminal or the routing protocol stack. In addition, the hierarchical mapping helps reduces the amount of locally and globally stored information, and thus accelerating the query.

A method for data transmission based on the preceding system for data communications is provided in the embodiments of the present invention. The following describes the method in this embodiment based on FIG. 4 to FIG. 9.

Figure 4:
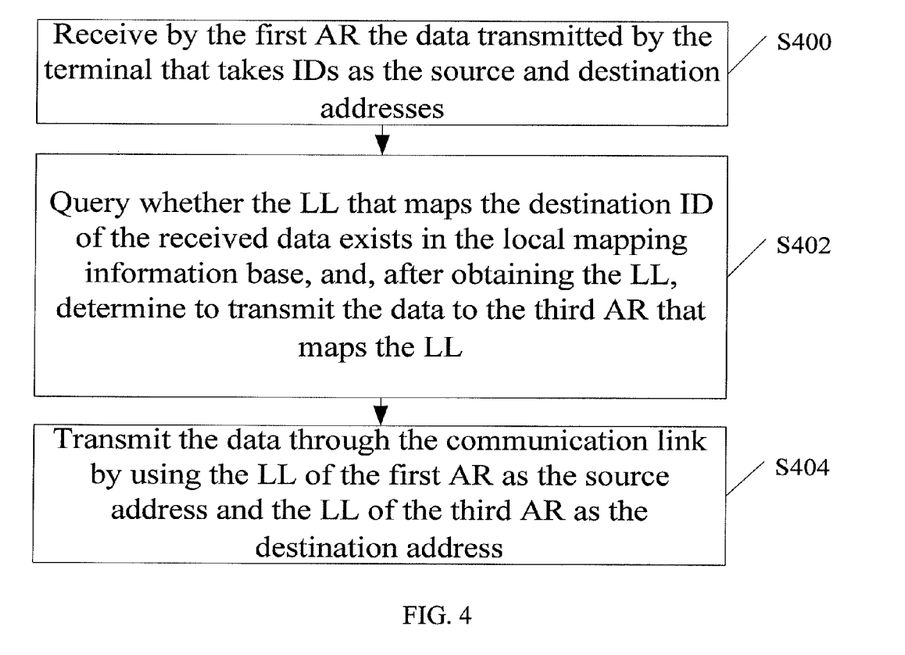
FIG. 4 is a flowchart of a method for data transmission according to an embodiment of the present invention.

FIG. 4 is a flowchart of a method for data transmission based on the preceding system for data communications according to an embodiment of the present invention. The embodiment provides a method for transmitting data between the terminals within the same area. As shown in FIG. 4, the method includes:

S400: Receive by the first AR the data transmitted by the terminal that takes IDs as the source and destination addresses.

S402: Query whether the LL that maps the destination ID of the received data exists in the local mapping information base, and, after obtaining the LL, determine to transmit the data to the third AR that maps the LL.

S404: Transmit the data through the communications link by using the LL of the first AR as the source address and the LL of the third AR as the destination address.

In practice, after a data transmission route is established between two terminals in the preceding embodiment, it is not necessary to query the route for the subsequent data transmission between the terminals, and the subsequent data can be directly transmitted according to the information temporarily stored by the router.

The following describes the method in this embodiment based on FIG. 1.

When transmitting data to terminal 30, terminal 10 uses the ID of terminal 10 (ID1) as the source address and the ID of terminal 30 (ID3) as the destination address.

If AR 11 in area 1 finds that the link to terminal 30 is not managed by itself after receiving data from terminal 10, AR 11 checks, by taking the ID3 of terminal 30 as the index, the local mapping information base for the LL of AR 13 that maps the ID3 of terminal 30. Therefore, AR 11 transmits the data to AR 13 through the communications link to AR 13; namely, an IP link encapsulation is added to the outer layer of the original data for transmitting the data, with the source address of the IP link encapsulation being the LL of AR 11 and the destination address being the LL of AR 13.

After receiving the data, AR 13 removes the IP link encapsulation from the outer layer, and then directly transmits the data to terminal 30.

Terminal 30 can directly return data to terminal 10 and terminal 10 can directly return data to the terminal 20 both based on the information temporarily stored in the router, without querying the route.

Figure 5:
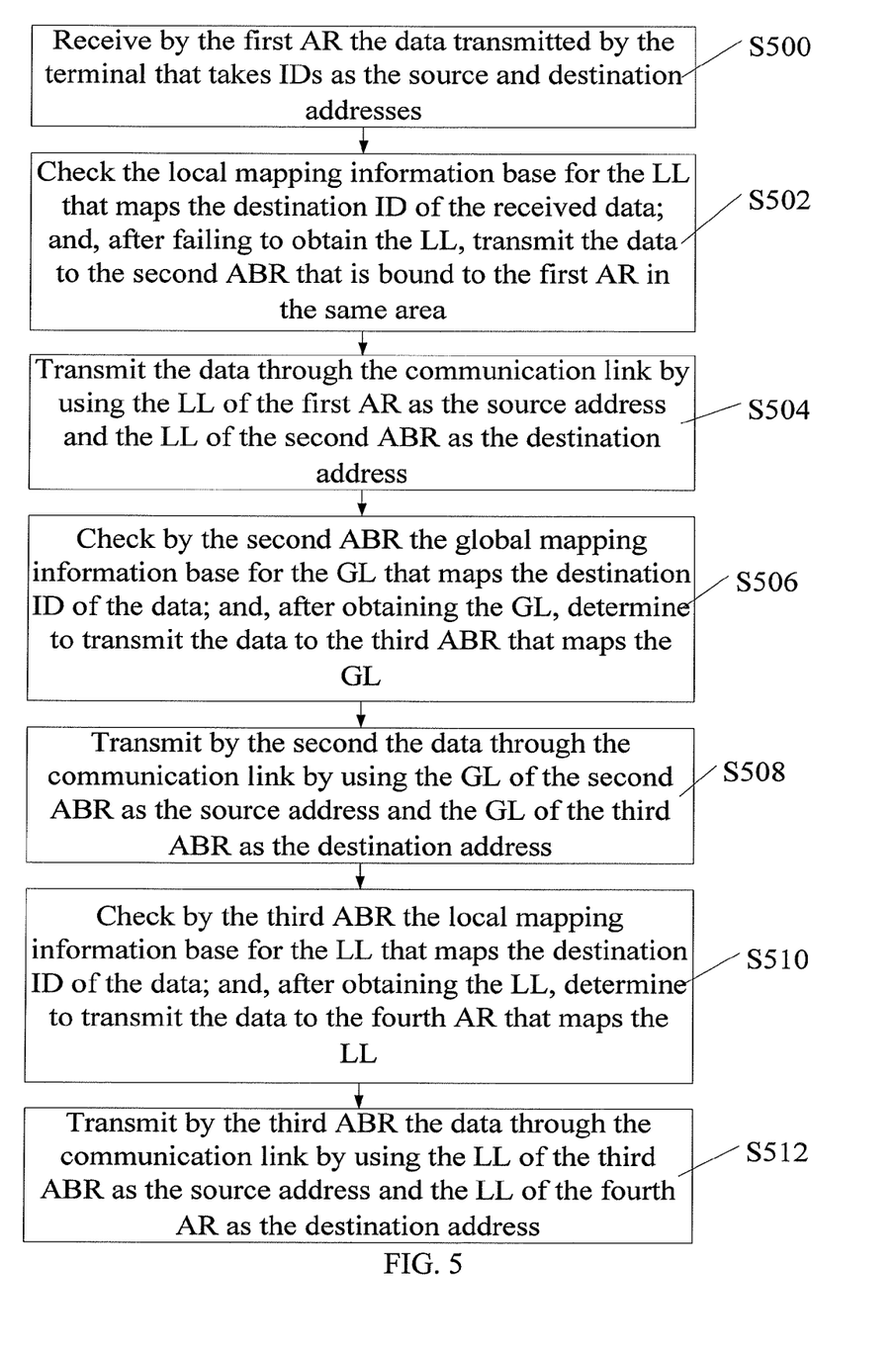
FIG. 5 is a flowchart of a method for data transmission according to another embodiment of the present invention.

FIG. 5 is a flowchart of a method for data transmission based on the preceding system for data communications according to another embodiment of the present invention. The embodiment provides a method for transmitting data between terminals within different areas. As shown in FIG. 5, the method includes:

S500: Receive by the first AR the data transmitted by the terminal that takes IDs as the source and destination addresses.

S502: Check the local mapping information base for the LL that maps the destination ID of the received data; and, after failing to obtain the LL, transmit the data to the second ABR that is bound to the first AR in the same area.

S504: Transmit the data through the communications link by using the LL of the first AR as the source address and the LL of the second ABR as the destination address.

S506: Check by the second ABR the global mapping information base for the GL that maps the destination ID of the data; and, after obtaining the GL, determine to transmit the data to the third ABR that maps the GL.

S508: Transmit by the second the data through the communications link by using the GL of the second ABR as the source address and the GL of the third ABR as the destination address.

S510: Check by the third ABR the local mapping information base for the LL that maps the destination ID of the data; and, after obtaining the LL, determine to transmit the data to the fourth AR that maps the LL.

S512: Transmit by the third ABR the data through the communications link by using the LL of the third ABR as the source address and the LL of the fourth AR as the destination address.

In practice, after a data transmission route is established between two terminals in the preceding embodiment, it is not necessary to query the route for the subsequent data transmission between the terminals, and the subsequent data can be directly transmitted according to the according to the information temporarily stored by the router.

The following describes the method in this embodiment based on FIG. 1.

When transmitting data to terminal 20, terminal 10 uses the ID of terminal 10 (ID1) as the source address and the ID of terminal 20 (ID2) as the destination address.

If AR 11 in area 1 finds that the link to terminal 30 is not managed by itself after receiving data from terminal 10, AR 11 checks, by taking the ID2 of terminal 20 as the index, the local mapping information base for the LL that maps the ID2 of terminal 20. AR 11 fails to obtain the LL that maps the ID of terminal 20, so it knows that terminal 20 is not within the local area.

AR 11 transmits the packets to ABR 12 in the same area through the communications link to ABR 12; namely, an IP link encapsulation is added to the outer layer of the original packet for transmitting the data, with the source address of the IP link encapsulation being the LL of AR 11 and the destination address being the LL of ABR 12.

After receiving the data, ABR 12 removes the IP link encapsulation from the header, queries the global mapping information base by taking the ID2 of terminal 20 as the index, and finds that the GL that maps terminal 20 is managed by ABR 21.

ABR 12 transmits the data to ABR 21 through an IP link, with the source address of the IP link encapsulation being the GL of ABR 12 and the destination address being the GL of ABR 21.

After receiving the data, ABR 21 removes the IP link encapsulation from the data, and queries the local mapping information base by taking ID2 as the index. After finding that ID2 maps the LL of AR 22, ABR 21 transmits the data to AR 22 through an IP link, with the source address of the IP link encapsulation being the LL of ABR 21 and the destination address being the LL of AR 22.

After receiving the data, AR 22 removes the IP link encapsulation from the outer layer, and then directly transmits the data to terminal 20.

Terminal 30 can directly return data to terminal 20 and terminal 10 can directly return data to terminal 20 both based on the information temporarily stored in the router, without querying the route.

Figure 6:
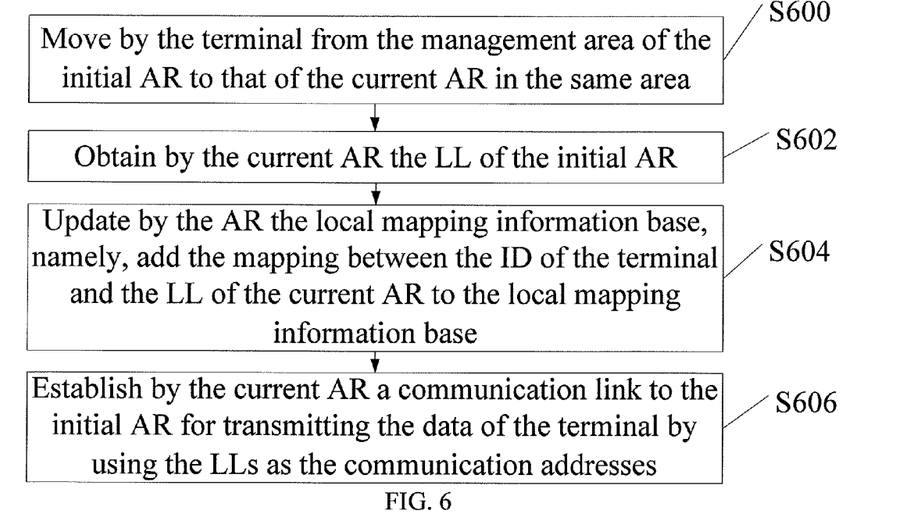
FIG. 6 is a flowchart of a method for data transmission according to another embodiment of the present invention.

FIG. 6 is a flowchart of a method for data transmission based on the preceding system for data communications according to another embodiment of the present invention. The method in this embodiment is used to ensure the continuity of data transmission when either of the terminals moves within the area after a data transmission tunnel is established between the terminals. As shown in FIG. 6, the method in this embodiment includes:

S600: Move by the terminal from the management area of the initial AR to that of the current AR in the same area.

S602: Obtain by the current AR the LL of the initial AR.

S604: Update by the AR the local mapping information base, namely, add the mapping between the ID of the terminal and the LL of the current AR to the local mapping information base; and S606: Establish by the current AR a communications link to the initial AR for transmitting the data of the terminal by using the LLs as the communications addresses.

In practice, after the current AR establishes a data transmission tunnel to the initial AR, the subsequent data of the terminal (the data to be transmitted to or by the terminal) can be directly transmitted through the tunnel, without querying the information base.

Figure 7:
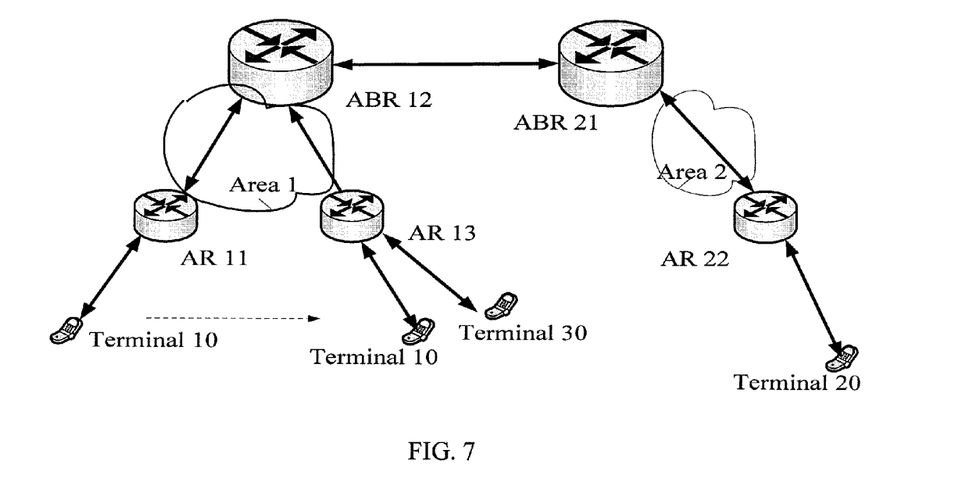
FIG. 7 shows another architecture of a system for data communications according to an embodiment of the present invention when a terminal moves within the same area.

The following describes the method in this embodiment based on FIG. 7.

When terminal 10 in area 1 and terminal 20 in area 2 are communicating with each other, if terminal 10 in area 1 moves from the management area of AR 11 in area 1 to that of AR 13 in the same area, the continuity of the call between terminal 10 and terminal 20 must be ensured. Therefore, the method includes:

receiving the LL of AR 11 obtained by AR 13 of terminal 10 from the local mapping information base, where: in practice, AR 13 can obtain the LL of AR 11 from the local mapping information base; in addition, because terminal moves within the same area, when attaching to AR 13, terminal 10 can carry information about the AR it previously attached to, namely, information about AR 11 (like ID);

buffering, by AR 11, the data to be transmitted to terminal 10 after terminal 10 leaves AR 11, where: in practice, AR 11 can set a buffering duration for the data of terminal 10, and deregister the mapping between the ID of terminal 10 (ID1) and the LL of AR 11 local mapping information base after the buffering duration expires;

updating, by AR 13, the local mapping information base, namely, adding the mapping between ID1 of terminal 10 and the LL of AR 13 to the local mapping information base; and sending a link establishment request to AR 11 based on the LL of AR 11; and responding to, by AR 11, the link establishment request from AR 13 to establish the link (if AR 11 does not buffer the data to be transmitted to terminal 10, no link needs to be established).

In practice, after the link is established, the communication traffic between terminal 10 and terminal 20 can be transmitted through the bi-directional link between AR 11 and AR 13.

Further, to optimize the route, after AR 11 and AR 13 establish a link in between, AR 13 and ABR 12 establish a communications link in between by using the LLs as the communications addresses, to replace the communications link between the fifth AR and the first AR for transmitting and receiving data for the terminal. After that, the subsequent data received by terminal 10 can be directly transmitted to AR 13 through ABR 12 instead of AR 11.

Figure 8:
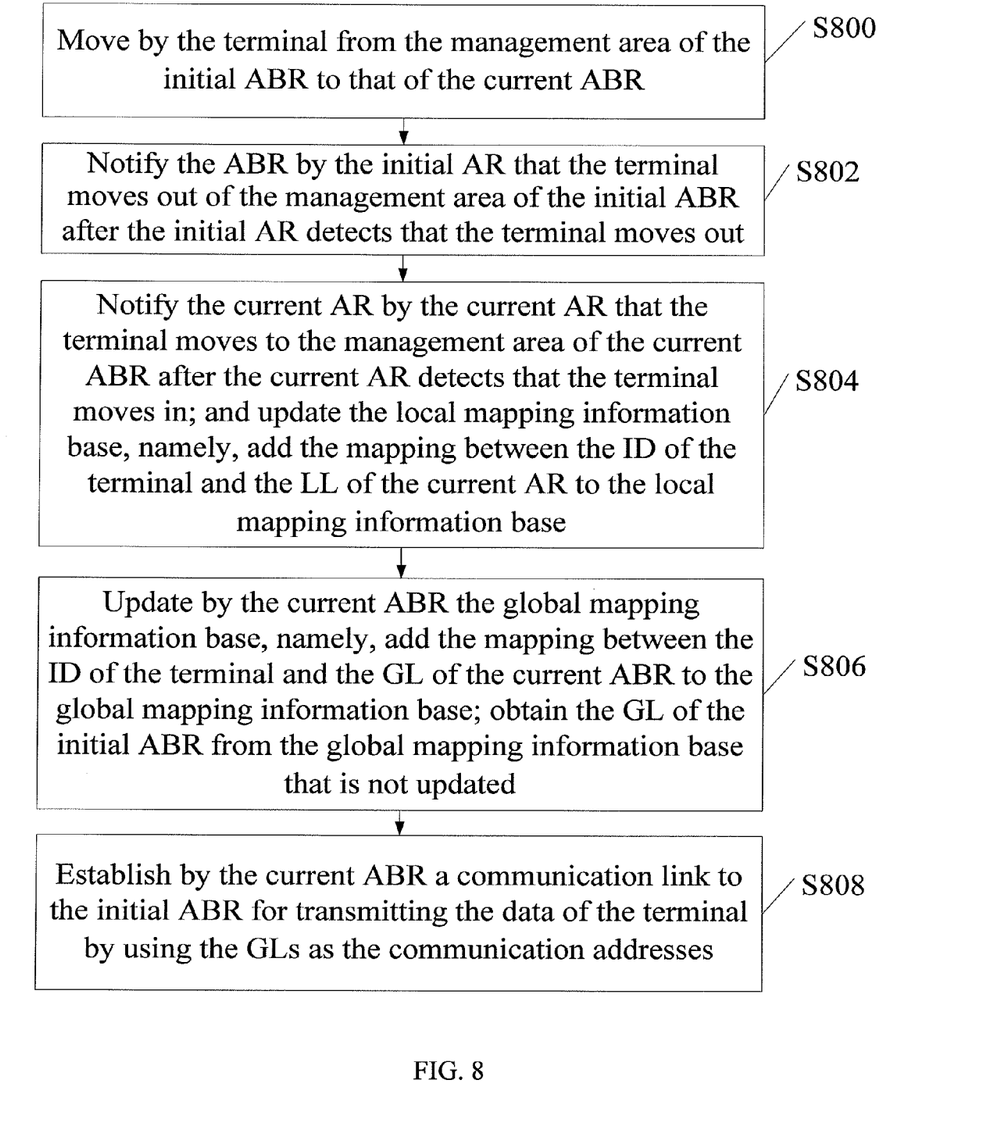
FIG. 8 is a flowchart of a method for data transmission according to another embodiment of the present invention.

FIG. 8 is a flowchart of a method for data transmission based on the preceding system for data communications according to another embodiment of the present invention. The method in this embodiment is used to ensure the continuity of data transmission when either of the terminals moves to a different area after a data transmission tunnel is established between the terminals. As shown in FIG. 8, the method in this embodiment includes:

S800: Move by the terminal from the management area of the initial ABR to that of the current ABR.

S802: Notify the ABR by the initial AR that the terminal moves out of the management area of the initial ABR after the initial AR detects that the terminal moves out.

S804: Notify the current AR by the current AR that the terminal moves to the management area of the current ABR after the current AR detects that the terminal moves in; and update the local mapping information base, namely, add the mapping between the ID of the terminal and the LL of the current AR to the local mapping information base.

S806: Update by the current ABR the global mapping information base, namely, add the mapping between the ID of the terminal and the GL of the current ABR to the global mapping information base; obtain the GL of the initial ABR from the global mapping information base that is not updated.

S808: Establish by the current ABR a communications link to the initial ABR for transmitting the data of the terminal by using the GLs as the communications addresses.

In practice, after the current ABR establishes a data transmission link to the initial ABR, the subsequent data of the terminal (the data to be transmitted to or by the terminal) can be directly transmitted through the tunnel, without querying the information base.

Figure 9:
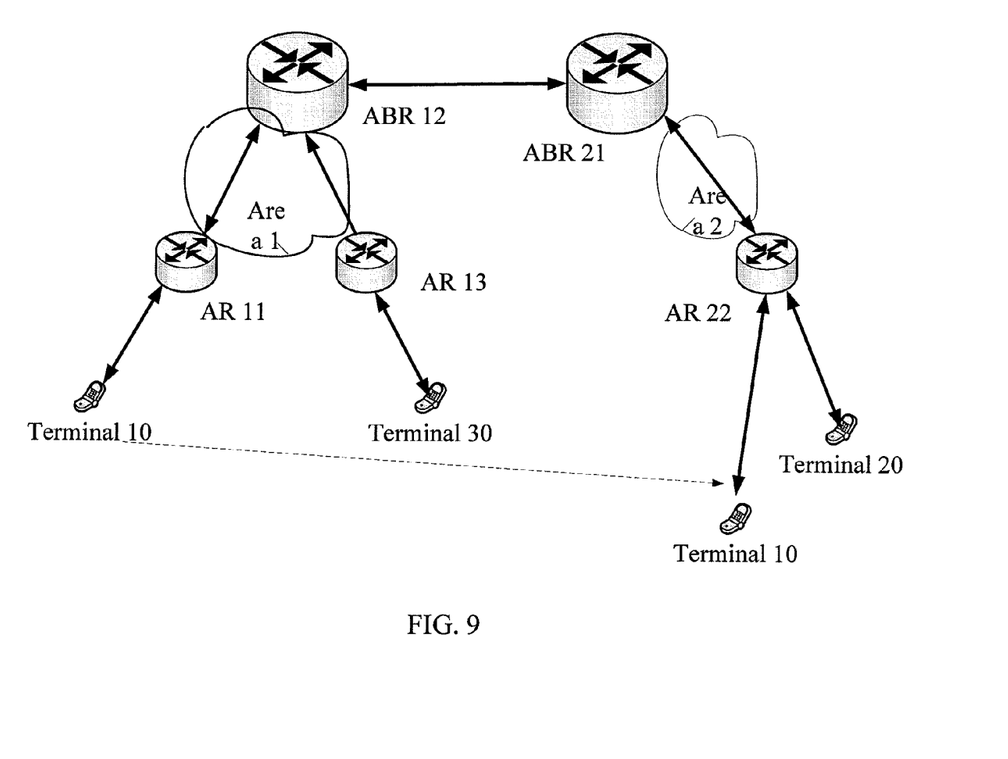
FIG. 9 shows another architecture of a system for data communications according to an embodiment of the present invention when a terminal moves within the same area.

The following describes the method in this embodiment based on FIG. 9.

When terminal 10 in area 1 and terminal 20 in area 2 are communicating with each other, if terminal 10 moves from the management area of ABR 12 in area 1 to that of ABR 21 in area 2, the continuity of the call between terminal 10 and terminal 20 must be ensured. Therefore, the method includes:

notifying, by AR 11, the ABR 12 that terminal 10 leaves area 1, after terminal 10 leaves area 1; buffering, by ABR 12, the data to be transmitted from terminal 20 to terminal 10, where: in practice, AR 11 can set a buffering duration for the data of terminal 10, and deregister the mapping between the ID of terminal 10 (ID1) and the LL of AR 11 after the buffering duration expires; deregistering, by ABR 12, the mapping between ID1 of terminal 10 and the GL of ABR 12 in the global mapping information base;

notifying, by AR 22, ABR 21 that terminal 10 enters area 2, when terminal 10 enters area 2 and attaches to AR 22; and updating, by AR 22, the local mapping information base, namely, adding the mapping between ID1 of terminal 10 and the LL of AR 22 to the local mapping information base;

updating, by ABR 21, the global mapping information, namely, adding the mapping between ID1 of terminal 10 and the GL of ABR 21 to the global mapping information base, after receiving the notification from AR 22; obtaining the GL of ABR 12 from the global mapping information base that is not updated;

sending, by ABR 12, a link establishment request to ABR 12; and responding to, by ABR 12, the link establishment request from ABR 21 to establish the link (if AR 11 does not buffer the data to be transmitted to terminal 10, no link needs to be established).

In practice, after the link is established, the communications traffic between terminal 10 and terminal 20 can be transmitted through the bi-directional link between ABR 12 and ABR 21.

Further, to optimize the route, after ABR 12 responds to the link establishment request from ABR 21 to establish the link, ABR 12 notifies ABR 21 of the current ID of terminal 10 (the mapping between ID 1 and the GL of ABR 21); and then, ABR 21 directly transmits the data from terminal 20 to terminal 10.

The embodiments of the present invention completely separate the ID, LL, and GL of the terminal, and thus solve the problems with the routing table expansion and scalability faced by the Internet. In this way, the terminal data can be transmitted without changing the terminal or the routing protocol stack. In addition, the hierarchical mapping helps reduces the amount of locally and globally stored information, and thus accelerating the query.

Those skilled in the art can understand that computer programs can instruct the related hardware to complete all or part of the processes in the methods in the preceding embodiments. These programs can be stored in the readable storage medium of a computer. During execution, the program can include the processes in the embodiments of the preceding methods. The storage medium can be a disk, an optical disk, a read-only memory (ROM), or a random access memory (RAM).

What is claimed is:

1. A system for data communications, configured to transmit data of a terminal that takes an identifier (ID) as source and destination addresses, wherein the system comprises at least one access router (AR) and at least one area border router (ABR):

the AR configured to: set local locators (LLs), establish communications links to devices within an area by using the set LLs, and transmit received data through transmission routes, the transmission routes being obtained by querying mapping between the ID and the LLs in a local mapping information base according to a destination ID of the received data; wherein the AR comprises:

a configuration module, configured to set an local locator (LL) as an intra-area communications address of the AR;

a link establishment module, configured to establish the communications links to the devices within the area by using the set LL;

a receiving module, configured to receive the data;

a query module, configured to query the LL that maps the destination ID of the data from the local mapping information base by using the destination ID of the data received by the receiving module;

a route identifying module, configured to identify a route for transmitting the received data based on results of querying the local mapping information base by the query module; wherein the route identifying module comprises: a first route identifying module, configured to determine to transmit the data to the AR that maps the LL obtained through query if the query module obtains the LL that maps the destination ID of the data in the local mapping information base; and a second route identifying module, configured to determine to transmit the data to the ABR that is bound to the AR in a same area if the query module does not identify an LL that maps the destination ID of the data in the local mapping information base;

a transmission module, configured to transmit the received data through the transmission route identified by the route identifying module and the link established by the link establishment module; and the ABR configured to: set global locators (GLs) and the LLs, establish communications links to devices outside the area by using the set GLs, establish the communications links to the devices within the area by using the set LLs, and transmit the received data through the transmission routes, the transmission routes being obtained by querying the mapping between the ID and the GLs in a global mapping information base according to the destination ID of the received data.

2. The system for data communications according to claim 1, wherein the AR further comprises: an information updating module, configured to update the local mapping information base and notify the ABR in the same area of update results when the terminal enters or leaves a management area of the AR.

3. The system for data communications according to claim 1, wherein the ABR comprises:

a configuration module, configured to set the global locator (GL) as an inter-area communications address and the LL as the intra-area communications address;

a link establishment module, configured to: establish the communications links to the devices outside the area by using the set GL, and establish the communications links to the devices within the area by using the set LL;

a receiving module, configured to receive the data;

a query module, configured to query the LL that maps the destination ID of the data from the local mapping information base by using the destination ID of the data received by the receiving module, or query the GL that maps the destination ID of the data from the global mapping information base;

a route identifying module, configured to identify the route for transmitting the received data based on the results of querying the local or global mapping information base by the query module; and a transmission module, configured to: transmit the received data through the transmission route identified by the route identifying module and the link established by the link establishment module.

4. The system for data communications according to claim 3, wherein the route identifying module further comprises at least one of:

a first route identifying module is configured to: determine to transmit the data to the AR that maps the LL obtained through query if the query module obtains the LL that maps the destination ID of the data in the local mapping information base; and a second route identifying module is configured to: determine to transmit the data to the ABR that is bound to the AR in a same area if the query module does not identify the LL that maps the destination ID of the data in the local mapping information base.

5. The system for data communications according to claim 3, wherein the ABR further comprises:

an information updating module, configured to: update the global or local mapping information base when the terminal enters or leaves a management area of the ABR.

6. The system for data communications according to claim 3, wherein the ABR further comprises at least one of:

a local mapping information storage module, configured to: store the local mapping information base; and a global mapping information storage module, configured to: store the global mapping information base.

7. The system for data communications according to claim 1, further comprising at least one of:

a local mapping information storage device, configured to store the local mapping information base; and a global mapping information storage device, configured to store the global mapping information base.

8. An access router (AR), comprising:

a configuration module, configured to set a local locator (LL) as an intra-area communications address of the AR;

a link establishment module, configured to: establish communications links to devices within an area by using the set LL;

a receiving module, configured to receive the data;

a query module, configured to query the LL that maps a destination identifier (ID) of the data from the local mapping information base by using the destination ID of the data received by the receiving module;

a route identifying module, configured to: identify a route for transmitting the received data based on results of querying the local mapping information base by the query module; wherein the route identifying module comprises:

a first route identifying module, configured to determine to transmit the data to the AR that maps the LL obtained through query if the query module obtains the LL that maps the destination ID of the data in the local mapping information base; and a second route identifying module, configured to determine to transmit the data to the ABR that is bound to the AR in a same area if the query module does not identify an LL that maps the destination ID of the data in the local mapping information base;

and, a transmission module, configured to: transmit the received data through the transmission route identified by the route identifying module and the link established by the link establishment module.

9. An area border router (ABR), comprising:

a configuration module, configured to: set a global locators (GL) as an inter-area communications address and a local locator (LL) as an intra-area communications address;

a link establishment module, configured to: establish communications links to devices outside an area by using the set GL, and establish communications links to devices within the area by using the set LL;

a receiving module, configured to receive the data;

a query module, configured to query the LL that maps a destination identifier (ID) of the data from a local mapping information base by using the destination ID of the data received by the receiving module, or query r the GL that maps the destination ID of the data from a global mapping information base;

a route identifying module, configured to: identify a route for transmitting the received data based on results of querying the local or global mapping information base by the query module; wherein the route identifying module further comprises at least one of:

a first route identifying module is configured to: determine to transmit the data to the AR that maps the LL obtained through query if the query module obtains the LL that maps the destination ID of the data in the local mapping information base; and a second route identifying module is configured to: determine to transmit the data to the ABR that is bound to the AR in a same area if the query module does not identify the LL that maps the destination ID of the data in the local mapping information base; and a transmission module, configured to: transmit the received data through the transmission route identified by the route identifying module and the link established by the link establishment module.

10. A system for data communications, configured to transmit data of a terminal that takes an identifier (ID) as source and destination addresses, wherein the system comprises at least one access router (AR) and at least one area border router (ABR):

the AR configured to: set local locators (LLs), establish communications links to devices within an area by using the set LLs, and transmit received data through transmission routes, the transmission routes being obtained by querying mapping between the ID and the LLs in a local mapping information base according to a destination ID of the received data; and the ABR configured to: set global locators (GLs) and the LLs, establish communications links to devices outside the area by using the set GLs, establish the communications links to the devices within the area by using the set LLs, and transmit the received data through the transmission routes, the transmission routes being obtained by querying the mapping between the ID and the GLs in a global mapping information base according to the destination ID of the received data;

wherein the ABR comprises:

a configuration module, configured to set the global locator (GL) as an inter-area communications address and the LL as the intra-area communications address;

a link establishment module, configured to: establish the communications links to the devices outside the area by using the set GL, and establish the communications links to the devices within the area by using the set LL;

a receiving module, configured to receive the data;

a query module, configured to query the LL that maps the destination ID of the data from the local mapping information base by using the destination ID of the data received by the receiving module, or query the GL that maps the destination ID of the data from the global mapping information base;

a route identifying module, configured to identify the route for transmitting the received data based on the results of querying the local or global mapping information base by the query module; and a transmission module, configured to: transmit the received data through the transmission route identified by the route identifying module and the link established by the link establishment module;

wherein the route identifying module further comprises at least one of:

a first route identifying module is configured to: determine to transmit the data to the AR that maps the LL obtained through query if the query module obtains the LL that maps the destination ID of the data in the local mapping information base; and a second route identifying module is configured to: determine to transmit the data to the ABR that is bound to the AR in a same area if the query module does not identify the LL that maps the destination ID of the data in the local mapping information base.

\* \* \* \* \*